July 27, 1926.
C. G. BUTLER
1,593,791
LUBRICATING APPARATUS
Filed Feb. 19, 1923
2 Sheets-Sheet 1
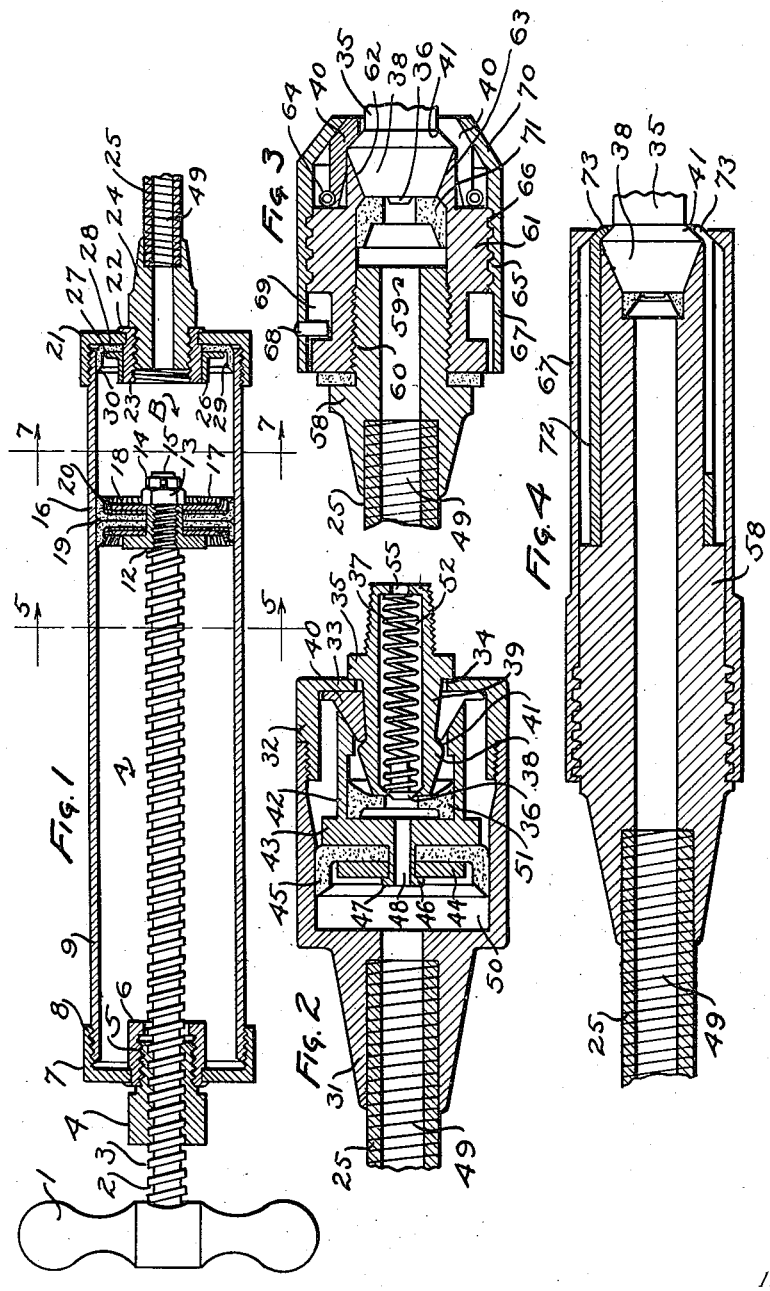
INVENTOR
Clyde G. Butler,
BY Toulmin & Toulmin,
ATTORNEY July 27, 1926.
C. G. BUTLER
1,593,791
LUBRICATING APPARATUS
Filed Feb. 19, 1923 2 Sheets-Sheet 2
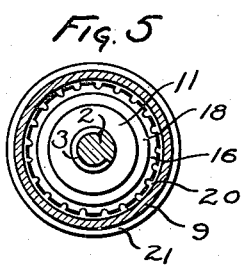
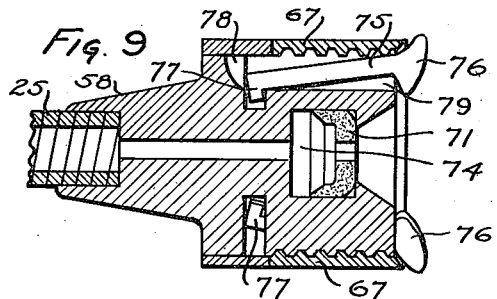
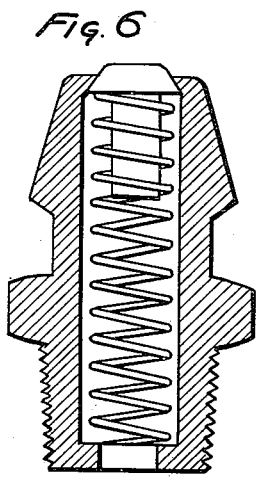
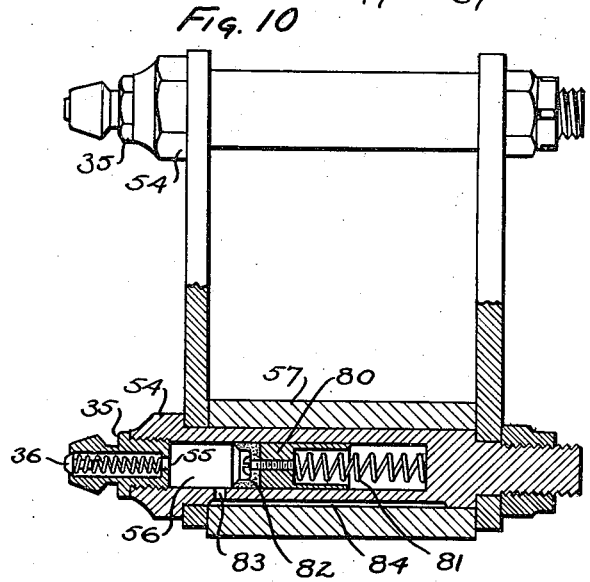
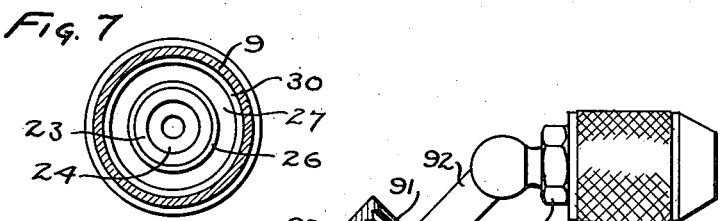
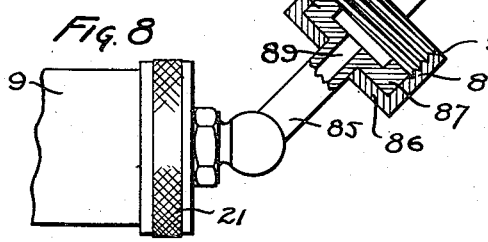
INVENTOR
Clyde G. Butler
BY Toulmin & Toulmin
ATTORNEY Patented July 27, 1926.

1,593,791

UNITED STATES PATENT OFFICE.

CLYDE G. BUTLER, OF DAYTON, OHIO.

LUBRICATING APPARATUS.

Application filed February 19, 1923. Serial No. 619,909.

My invention relates to lubricating apparatus and in particular to a force feed lubrication for bearings and the like in automotive equipment and similar mechanism, and also relates to a method of lubrication.

It is my object to provide a means of forcing under high pressure fluid and semi-fluid lubricating compounds into bearings and into bearing reservoirs in order that foreign material and used lubricant therein may be forced out of the bearing or out of the bearing reservoir. It is my object to provide a co-operating bearing and self sealing bearing lubricating valve. It is a further object to provide in combination with the self-sealing bearing valve a bearing reservoir for lubricant and means for automatically feeding the lubricant therefrom to the bearing.

It is a further object of my invention of providing automatic and semi-automatic means of connection between the bearing valve and the lubricating pressure means or grease gun so-called.

It is a further object to provide either a flexible connection between the bearing valve and the grease gun or a rigid connection, both of said connections being susceptible of being positioned in any desired place relative to one another in order to accommodate for the location in restricted areas of the bearing and bearing valves.

It is a further object of my invention to provide a self-refilling grease gun which is adapted to draw the grease or other lubricant into it without the necessity of using a paddle or other means of drawing the grease into the gun or placing it in the gun.

It is a further object to provide such a gun so constructed that it will draw the grease through the restricted aperture through which it passes when being forced into the bearings.

It is an additional object to provide a self-sealing gun in order that the joint between the head of the gun and the barrel thereof will be automatically self-sealing, the joint becoming tighter the greater the pressure.

It is an additional object to provide a self-sealing piston. It is an additional object to provide a piston head that will not rock upon the piston and will not strip therefrom under the pressure.

It is an additional object to provide a grease gun which will have the piston adapted to be advanced slowly but which may be retracted quickly for recharging or other purposes.

It is a further object of my invention to provide automatic and semi-automatic connections between the grease gun and the bearing valve which may or may not be locked in position as desired by the operator or may be automatically locked.

It is a further object to provide in the lubricating valve a broad bearing for the valve member as distinguished from a bearing consisting of merely a single point of contact as in the case of a ball. It is a further object to provide a valve member which will seat itself automatically. It is a further object to provide a valve member which may be readily located in its seat by the yielding means and will not be upset.

It is a further object to provide a valve member which will readily allow the lubricant to pass thereby but will be of such design that any accumulation of foreign material will not prevent it from seating or will not disturb it with relation to the resilient means which supports it to seat it.

Referring to the drawings:

Fig. 1 is a section through the grease gun with the piston and handle in full lines;

Fig. 2 is a section through a portion of the flexible coupling, the chuck, and the bearing valve showing a semi-automatic chuck;

Fig. 3 is a similar view showing a modified form of the chuck;

Fig. 4 is a similar view showing an elongated type of spring finger chuck;

Fig. 5 is a section on the line 5—5 of Fig. 1, looking in the direction of the arrow, viewing one end of the piston head;

Fig. 6 is a detail of the bearing valve, partially in section;

Fig. 7 is a section on the line 7—7 of Fig. 1, looking in the direction of the arrows, showing a plan view of the self-sealing end of the grease gun;

Fig. 8 is an elevation with the joint partially in section of the rigid connection between the grease gun and bearing valve;

Fig. 9 is a section of a modified construction of chuck for connecting the grease gun to the bearing valve;

Fig. 10 is a view partly in section of a bearing and shackle links showing the bearing valve installed, the bearing reservoir and the automatic means for self-feed of lubricant from the reservoir to the bearing.

Referring to the drawings in detail, 1 is a handle mounted on a piston 2 having threads 3 thereon constituting a worm. This worm travels in an internally threaded guide or nut 4 that is externally threaded at 5. 4 is therefore threaded into an internally threaded collar 6 permanently held in the head 7 of the grease gun. This head is threaded at 8 upon the barrel 9 of the gun proper. Within the barrel 9 travels the rod 2 on one end of which is threaded a collar 10 having a shoulder 11. This collar is seated upon the rod 2 as at 12. It will be observed that at 12 there is a shoulder cut into two, to prevent the pressure pushing 11 and 10 back along the rod 2 and preventing 10 and 11 from rocking or upsetting. 11 is firmly engaged against the shoulder 12 by reason of the nut 13 which is castellated at 14 and held in position by a small cotter pin 15. Between 11 and 13 are located the following, a spring washer having a plurality of bent up spaced teeth, the washer being designated 16 and the teeth 17, a plain washer 18, and a pair of diverging leather washers 19 having diverging sealing portions 20. The spring washers 16 with their spring teeth 17 serve to keep the leather washers 19 in engagement with the walls of the cylinder 9, thus sealing the grease gun. The several washers and leather members are embraced between 11 and 13 and maintained rigidly at right angles to the lateral movement of the whole piston head thus formed as it moves laterally.

By maintaining such a seal and by the use of the worm, I am enabled to secure pressure up to 1500 pounds within this gun.

One of the difficulties inherent in former grease guns has been the leaking around the head of the gun and the difficulty of properly sealing this head.

In the case of my invention it is unnecessary to remove this head and because of the very tight seal secured by the piston head just described, I am enabled to draw in the lubricant into the cylinder in area B, yet if it is desired to remove this head in my construction it can be done and restored without destroying the seal.

The head consists of an outside internally threaded collar 21 in which there is centrally located permanently a collar 22 having an internally threaded inward projection 23. There is threaded into this the coupling head 24 which supports the coupling hose 25.

It will be understood that this hose may be either flexible or rigid as in Fig. 8.

Surrounding 23 is a closely fitting collar 25 having a shoulder 27 which engages with a leather washer 28 resting against the inside of 21 between 27 and 21 and having an upwardly extending portion 29 beveled on the interior thereof at 30.

It will be seen that when the grease is under pressure in area B that it will force down the shoulder 27 upon the washer 28 against 21 and will also force ouwardly 29 against the wall of the cylinder 9. The greater the pressure the more perfect will be the seal in this head thus preventing the escape of lubricant.

When it is desired to quickly retract the piston head and the piston rod the nut 4 is retracted out of 6 thus allowing the air in area A to escape as the piston is withdrawn quickly but the seal being perfect between the barrel 9 and the piston head a vacuum is created in B and if the grease gun has its coupling 25 immersed at the end in lubricant the lubricant will be drawn through 25, 24, into B, thus automatically filling the grease gun without the necessity of taking off the head and forcing the grease in by a paddle or other means which is customary in the present state of the art.

Proceeding to the description of the apparatus employed in connection with the practice of the rest of my method, the coupling 25 has mounted on the outer end thereof a head 31. The outer end of this head has internally threaded therein a collar 32 having a turned-in portion 33 with an aperture 34 through which projects the valve member 35 in which is located a valve 36 maintained in position against the seat by a spring 37, the axle of which will be hereinafter described. This member 35 is composed generally of two parts, a conical head proper 38 and a restricted portion or throat 39. A plurality of segments 40 slightly spaced from one another are adapted to slip over the head 38 and embrace the slot 39. The shoulder 41 on 38 prevents the retraction of these segments 40 due to the fact that they are held in position on the throat by the spring fingers 42, a plurality of which are mounted upon a base 43 which forms a part of a piston head that consists of 43, a metallic washer 44 embracing between it and 43 a leather sealing washer 45. This union of the parts 45, 44 and 43 is effected by 43 having a tubular member 46 projecting through 45 and 44 and bent over at 47 upon 44. A passage way 48 is left through 46 for the passage of lubricant. The lubricant comes through the tubular member 25 through the passage way 49 into the expanded area 50 within 31. The area 50 will fill up with lubricant because the delivery of lubricant to 50 will be at a greater rate than the lubricant can pass through 48. This will result in 44, 45 and 43, together with the fingers 42, being forced forwardly, maintaining the segments 40 in close engagement with 39. The washer 51 provides a ready means of adjusting the junction of 38 with the remainder of the mechanism and effectively seals the connection so that the lubricant will pass through 48 into 52 after having pushed back the rivet or stud 36. This rivet or stud is held in position by the spring 37 yieldingly and cannot upset due to the fact that its shaft 53 projects into the coil of the spring 37.

It will be understood that 35 is threaded into the bearing as shown in Fig. 10 at 54. The aperture 55 permits the movement of the lubricant into the reservoir 56 in the shackle bolt or to any other suitable reservoir for lubricating the bearing. The spring member is shown at 57 riding upon the bolt 54.

Returning to Fig. 2 and its operation, it will be understood that the coupling on the end of 25 is thus pushed over 35, the segments 40 engage with the throat and are maintained in engagement by the pressure being greater on the piston within the coupling than any relief of the pressure that will be possible through the passage of the lubricant through 48.

As soon as the pressure is relieved it is then possible to withdraw the coupling from the member 35 as the pressure on the fingers 42 will be relieved and the spaced segments 40 will slip over the shoulders 41 due to the pressure of 33 against the ends of the several segments 40.

It will be seen that this coupling eliminates the necessity for a delicate adjustment by the operator of the coupling to the valve member which is often times difficult in restricted areas frequently found on automotive vehicles where this type of equipment is especially useful.

Referring to Fig. 3, 25 is the usual connecting member upon which is mounted a head 58. This head 58 has a passage way for the lubricant at 59 and is externally threaded at 60. A collar 61 is adapted to be threaded on 58 to engage with the threads 60. This collar has a cup-shaped outer end at 62 adapted to fit the conical head of 35 designated 38. 61 is cut away at its outer end to form a cylindrical member of smaller diameter than the rest of the body which is designated 63. On the exterior of this cylindrical member there are mounted a plurality of segments 40 and surrounding these segments, adapted to draw inner ends thereof towards 63, is a helical spring 64 thus constantly tending to keep the jaws formed by the segments 40 open for the reception of 39. The segments 40 are so designed that at their inner ends they are tapered and at their outer ends they are bent over in the form of fingers to engage the shoulder 41 of 38.

61 carries a plurality of coarse threads 65 adapted to engage similar threads 66 on the interior of a collar 67. This collar carries a pin 68 traveling in a cutaway portion 69 in 61 to prevent 67 from being backed completely off of 61. The outer end of 67 is restricted into a conical shape as at 70 so that the inner surface of this restricted end will engage with a similar tapered surface of the members 40 adapted to force the outer of ends of 40 to engage with the shoulders 41 of 38 and thus lock this coupling to the valve member. Adjustments in size wear and position are provided for by the yielding washer 71 between 38 and 58.

Referring to Fig. 4, there will be seen a modification of this same principle of semi-automatic engagement of the coupling with the valve member. The fingers 72 are slightly separated from one another, have turned-in ends 73 to engage with 41 of 38, and are adapted when not under compression to spring outwardly. The collar 67 is adapted to compress these spring fingers just as in Fig. 3. The head 58 is of somewhat similar construction. 67 is adapted to be threaded on 58. The parts are shown in somewhat different proportions in order to accommodate situations where a remote valve member necessitates a long, narrow coupling.

Referring to Fig. 9, the head 58 in Fig. 9 is provided with a chamber 74 in the head thereof in which is located the usual washer 71 for the accommodation for the size or the parts and their wear. The valve member is retained in engagement with the head by a plurality of loose fingers 75 having heads 76 to engage with the shoulder 41 and retaining ends or lugs 77 engaging in a groove 78 in 58. Each finger 75 travels in its respective slot 79 in 58. By threading the members 67 forward on 58 these outer ends of the fingers 76 are drawn together and thereby engage 38 by engagement with the shoulder 41 thereof.

Referring to Fig. 10, when the lubricant has been forced through 35 into 56 under great pressure it forces back the piston 80 against the spring 81 until 56 is completely filled. When the pressure is withdrawn 36 seals the reservoir and the lubricant therein is then subjected to pressure of the piston 80 with the spring behind it. 82 is the usual washer. The lubricant is therefore constantly under pressure and constantly being forced outwardly so that it passes out through a typical exit opening 83 into a lubricating channel 84 to lubricate the engagement of the bolt 54 and the remainder of the mechanism 57 thus constantly forcing fresh, clean grease into engagement with the parts and forcing outwardly the used lubricant or lubricant which may have become contaminated by foreign material getting into it.

In Fig. 8, I have shown my rigid form of coupling between the lubricant pressure apparatus and the chuck or union for connecting with the lubricant valve a member to be lubricated.

This construction consists of the lubricating apparatus having a chamber 9 with the head 21 to which is attached a tubular member 85 at an angle thereto. This tubular member has a passage therein designated 86. At the end of 85 is a plate 87. Surrounding 85 and beneath 86 is a collar 88 having a shoulder 89 and internally threaded at 90 to engage with a threaded head 91 of a second tubular member 92 attached at an angle to the chuck 58 or any similar attaching member between the source of supply and the part to be lubricated. A washer 93 is interposed between 87 and 91 to seal the parts.

It will be seen from this arrangement that by loosening the collar the tubular members can be adjusted with respect to one another at varying angles so as to bring 58 and 9 parallel to one another or at varying angles to one another according to the position in which it is necessary to place the several parts in order to effect their lubrication from the source of supply to the part to be lubricated. This eliminates the flexible hose 25 where it is found inadvisable to employ it.

While I have shown and described certain features as constituting my invention, it will be understood that parts have been shown for purposes of illustration only, and that I do not desire to be limited to such details, as obvious modifications will occur to a person skilled in the art.

Having thus fully described my invention, what I claim as new and desire to secure by Letters Patent, is:—

1. The combination with a nipple for receiving lubricant, of a lubricant compressor having a coupling for connecting said compressor and nipple the coupling comprising a cylinder, a piston movable within the cylinder, and having an aperture for the discharge of lubricant therethrough and an apertured seat for engagement with the end of the nipple, and means carried by the cylinder for compressively engaging about the nipple for locking said parts together against longitudinal displacement and actuated by said piston whereby the pressure of the lubricant on said piston will move the piston to forcibly compress said means, while the lubricant is passing through said connecting parts.

2. The combination with a headed nipple for receiving lubricant, of a lubricant compressor having a coupling member for connecting said compressor and nipple comprising a cylinder, a piston movable within the cylinder, and having an aperture for the discharge of lubricant thereof, an apertured sealing seat carried by said piston for engagement with the end of the nipple, connecting the piston aperture with a passage through the nipple, radially movable locking elements carried by the cylinder coacting with the nipple and actuated by said piston for compressively clutching the elements upon the nipple whereby the pressure of the lubricant on said piston will move the piston to forcibly compress said elements while the lubricant is passing through said connecting parts.

In testimony whereof, I affix my signature.

CLYDE G. BUTLER.